(12) United States Patent
Purgert et al.

(10) Patent No.: US 7,582,361 B2
(45) Date of Patent: Sep. 1, 2009

(54) LIGHTWEIGHT STRUCTURAL MEMBERS

(76) Inventors: Robert M. Purgert, 166 Marko La., Brooklyn Heights, OH (US) 44131; Jerzy Sobczak, Ul. Beskideka no. 35/36, Krakow (PL); Lawrence C. Boyd, Jr., 2708 Coventry Rd., Shaker Heights, OH (US) 44120; Nipendra P. Singh, 2573 Butterwing Rd., Pepper Pike, OH (US) 44124; Bruce P. Bardes, 7651 Cornell Rd., Montgomery, OH (US) 45242

(*) Notice: Subject to any disclaimer, the term of this patent is extended or adjusted under 35 U.S.C. 154(b) by 0 days.

(21) Appl. No.: 10/872,812

(22) Filed: Jun. 21, 2004

(65) Prior Publication Data

US 2005/0281972 A1    Dec. 22, 2005

(51) Int. Cl.
  *B32B 5/18*    (2006.01)
  *B32B 15/02*   (2006.01)
  *B22B 19/02*   (2006.01)
  *C22C 1/08*    (2006.01)

(52) U.S. Cl. .......................... 428/613; 428/653; 165/97; 165/98

(58) Field of Classification Search ........................ None
  See application file for complete search history.

(56) References Cited

U.S. PATENT DOCUMENTS

| | | | | |
|---|---|---|---|---|
| 3,087,807 A * | 4/1963 | Allen et al. | ..................... | 75/415 |
| 4,888,054 A * | 12/1989 | Pond, Sr. | ..................... | 75/234 |
| 4,973,358 A * | 11/1990 | Jin et al. | ..................... | 75/415 |
| 5,228,494 A * | 7/1993 | Rohatgi | ..................... | 164/97 |
| 5,281,251 A | 1/1994 | Kenny et al. | ................... | 75/415 |
| 5,334,236 A | 8/1994 | Sang et al. | ..................... | 75/415 |
| 5,611,568 A * | 3/1997 | Masuda | ..................... | 280/784 |
| 5,711,363 A * | 1/1998 | Scruggs et al. | .............. | 164/113 |
| 5,899,256 A * | 5/1999 | Rohatgi | ..................... | 164/97 |
| 6,015,041 A * | 1/2000 | Heung | ..................... | 206/70 |
| 6,444,007 B1 | 9/2002 | Knott et al. | ................... | 75/228 |
| 6,510,763 B1 * | 1/2003 | Streubel et al. | ............... | 74/588 |
| 7,328,831 B1 * | 2/2008 | Topolski | ..................... | 228/227 |
| 2002/0066254 A1 * | 6/2002 | Ebbinghaus | ............... | 52/735.1 |
| 2002/0104405 A1 * | 8/2002 | Haack et al. | .................. | 75/249 |
| 2003/0029902 A1 * | 2/2003 | Blucher | ..................... | 228/101 |
| 2003/0030181 A1 * | 2/2003 | Raghunathan et al. | ...... | 264/280 |
| 2003/0051850 A1 * | 3/2003 | Asholt et al. | .................. | 164/79 |

* cited by examiner

*Primary Examiner*—John J Zimmerman
(74) *Attorney, Agent, or Firm*—Bruce P Bardes

(57) ABSTRACT

A class of lightweight structural members, characterized by lighter weight and greater resistance to buckling under axial compressive loading, as compared to conventional structural members, is described. The lightweight structural members typically comprise a thin tubular member filled with a metallic foam material. The foam material preferably comprises particulate matter comprised of agglomerated fly ash material, and, preferably, gaseous material in pores within the foam material.

Figure 1:
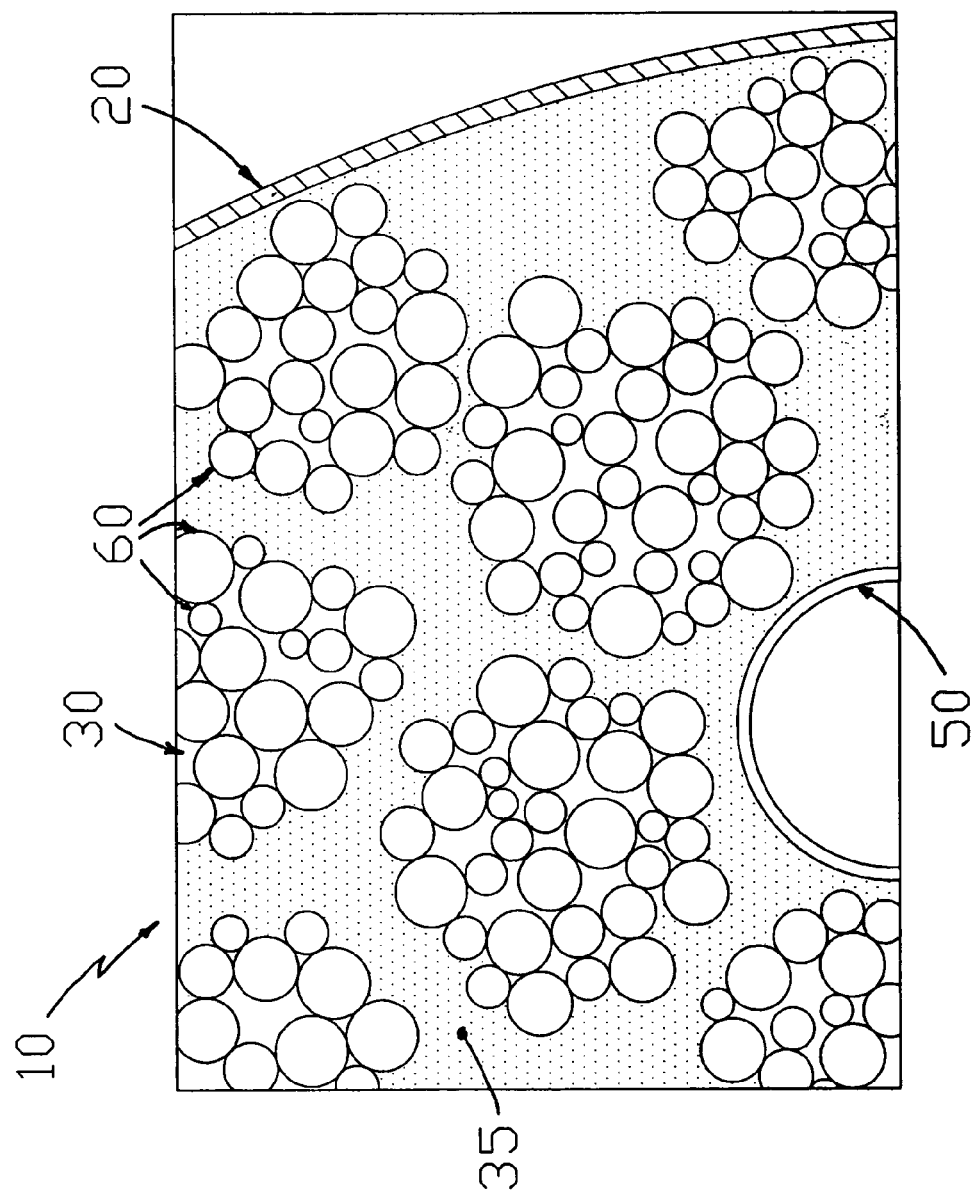

In an alternate configuration, the lightweight structural member comprises two tubular members, one nested inside the other, wherein the annular volume between the tubular members is filled with metallic foam material.

A method for manufacturing the structural members is also described.

26 Claims, 5 Drawing Sheets

LIGHTWEIGHT STRUCTURAL MEMBERS

FIELD OF THE INVENTION

This invention relates generally to structural members, such as those used in buildings and machines. It relates particularly to structural members designed to be light in weight, yet resistant to plastic deformation and buckling.

BACKGROUND OF THE INVENTION

The background for the present invention is drawn from two distinct technologies. One technology addresses the response of structures and structural members to loading, and design technologies directed toward preventing failures of such members during service. The other technology addresses the manufacture of structural members (and components thereof) such as those related to the present invention.

Engineers who design various structures typically consider many potential failure modes during the design process. They also consider the types of loading, and the environment, in which a structure will operate. They examine the possibility of overload, wherein a material employed in the structure is loaded beyond its strength capability. In this situation, the mode of failure may be brittle, where failure occurs with minimal deformation, or ductile, where some deformation of the material occurs prior to fracture. Ductile failure comprises permanent or plastic deformation, typically of sufficient magnitude such that the structural member assumes a new shape that is unable to perform the intended function of that member.

Engineers also consider the effects of an aggressive environment on a material, wherein the environment degrades the strength of the material. They consider the effects of temperature on a material, for the ability of a material to withstand a load typically decreases with increasing temperature. They consider cyclic loading, wherein a crack can develop and grow to the point where catastrophic failure occurs. These failure modes may occur instantly, or gradually over the intended service life of the structural member.

Engineers must also consider the possibility that the configuration of the structure may become unstable in service, and if so, failure may consequently occur in a mode called buckling. One situation where buckling is a major design consideration is a slender member that is subjected to axial compressive loading. An example of this situation exists in many types of buildings, where a column is employed to support the floors and walls of an upper level of the building. To conserve building materials, and to maximize flexibility of building design, such columns are desirably as small in cross section as is safe. The problem of column buckling has existed since prehistoric man created the first towers and buildings. Leonhard Euler, the eminent Swiss mathematician and physicist, published a solution to the column buckling problem in 1744. He described a critical load necessary to cause buckling as a function of the physical dimensions of the structural member, notably its length and cross sectional configuration, and the modulus of elasticity of the material employed in that member. It should be noted that the strength of the material employed in the column is not a factor in Euler's solution to the column buckling problem.

It has also been shown that the critical load necessary to cause buckling of a column also depends on the manner of application of service loads to the structural member and constraints against movement of the extremities of the structural member.

There are many other types of structural members that are subject to buckling. Some of these are: beams in three-point bending, flat sheets subjected to in-plane bending, and shafts in torsion. In the latter case, buckling may occur by twisting a straight structural member into a coil-like shape, or by collapsing a tubular structural member across its own cross section. Tubular structural members are very useful because they are lighter than solid members of similar shape, but they are particularly vulnerable to buckling. Solutions to these and other buckling problems are well known to those who are skilled in the applicable arts.

As a practical matter, the design of structures and structural members that may be subject to buckling is focused on that mode of failure. Once an engineer has designed a structure to withstand the intended service loads without buckling, he/she then checks the design to confirm that the structure can withstand such service loads without failing in other modes of failure. With such a design procedure, a column or shaft designed to prevent buckling will generally be tubular in overall configuration. To facilitate both design and manufacture, such structural members are often circular in cross section. The structural member must have a diameter large enough so that the member maintains its overall straight configuration, and a wall thickness great enough to eliminate change in cross sectional shape as a cause of buckling.

One result of this design procedure is that it leads to wall thicknesses that are greater than might be desired, particularly from the perspective of minimizing weight of structural components. The present invention addresses this matter, comprising a novel approach to designing and fabricating lightweight structural components that are highly resistant to buckling.

One embodiment of the present invention comprises placement of metallic foam in an internal cavity in a hollow structural member, thereby inhibiting the buckling of the structural member. There are many techniques for producing metallic foams; Knott et al (U.S. Pat. No. 6,444,007) list five categories of procedures for manufacturing metallic foams. Other techniques and variations in the procedures listed by Knott et al are possible. Some of these techniques are relevant to the present invention, provided that problems involving placement of foam within the structural member can be solved. The disclosures of Jin et al (U.S. Pat. No. 4,973,358), Kenny et al (U.S. Pat. No. 5,281,251) and Sang et al (U.S. Pat. No. 5,334,236), all assigned to a common assignee, describe technologies for producing metallic foam that can be configured to a predetermined shape, subject to certain process limitations. Shapovalov (U.S. Pat. No. 5,181,549) discloses another method for producing metallic foam. He further discloses a method for producing metallic foam having a skin of the same material as the foam itself. However, there are significant limitations in the shapes of products that can be made by Shapovalov's methods. In the context of the present invention, these, and other such methods, may be employed for placing the foam in an internal cavity in a structural member. The methods described hereinabove are exemplary of prior art. One skilled in the applicable arts will recognize that these methods may be adapted to the present invention without limiting the true scope and breadth of the present invention.

BRIEF DESCRIPTION OF THE INVENTION

As indicated above, there are many instances where the dimensions of structural members are not dictated by the loads that those members must carry, but by the possibility that those members might buckle in service. Accordingly, such structural members must be sufficiently massive to prevent buckling. In the case of a hollow structural member, the wall thickness is a critical factor in predicting whether failure by buckling might occur. In designing such a structural member, one must make the wall sufficiently thick to prevent buckling. In so doing, one often commits to a wall that is typically far thicker than is necessary to carry the load imposed on the member, and far heavier than might otherwise be necessary.

The present invention addresses this broad class of hollow structural members by providing support for the wall of such a structural member, thereby reducing the likelihood of buckling without increasing the wall thickness beyond that required to carry the load imposed on the member. In various embodiments of the present invention, the volume within a hollow structural member is filled with a lightweight, yet rigid, material, such that distortion of the structural member in any given cross section is inhibited. In one common mode of failure of hollow structural members, the section is flattened to the point where the cross section is little more than two thicknesses of wall material adjacent to one another. Preventing any such flattening effectively prevents such buckling of the structural member.

The material employed for inhibiting buckling in various embodiments of the present invention is so inexpensive that it is simply put into place inside a hollow structural member and left there. In some situations, it weighs so little that its weight is less than the weight of the additional material that would otherwise be needed, if one were to make the wall of the structural member thick enough to resist buckling on its own. The material employed in some embodiments of the present invention also utilizes what is normally considered waste material, for which disposal typically involves considerable inconvenience and expense. In the foregoing discussion, buckling refers to collapse of a slender structural member under axial compressive loading; this is the problem solved by Euler more than 250 years ago. There is another type of buckling, namely, subjecting a hollow structural member to radial loading of sufficient magnitude to crush or dent the structural member. In the interest of clarity, this type of loading is termed a crushing load. In the present discussion, such loads are termed crushing loads, and the mode of buckling is termed crush buckling. Various embodiments of the present invention inhibit crush buckling.

Specifically, some embodiments of the present invention employ a substance produced during operation of coal-fired electric power generating plants, known as fly ash, to fill the space inside hollow structural members. Disposal of fly ash is a significant problem for operators of such plants. The fly ash is secured in place within the structural member by filling, or partially filling, the space between fly ash particles with molten aluminum, or an alloy thereof, and allowing the molten aluminum to freeze. Using the method of the present invention, it is possible to trap air bubbles in the molten aluminum, thereby substantially reducing the overall density of the foam material. Such a structure, which may be termed a foam material, comprises fly ash particles and, optionally, air bubbles in an aluminum matrix.

While it may be possible to produce fly ash having properties amenable to use in accordance with the present invention, operators of generating plants typically operate such plants for maximum efficiency in generating electricity. Under such conditions, the fly ash particles are typically too fine to be used as described herein. Thus, an important aspect of the present invention involves agglomerating fly ash particles into larger particles. The molten aluminum penetrates the interstices between particles of agglomerated fly ash far more effectively than the interstices within a bed very small fly ash particles that are typically produced in a power plant.

Fly ash particles produced during operation of a generating plant are often hollow spheres of a glassy substance; such particles are usually called cenospheres. The weight of such cenospheres is very small, contributing very little to the weight of a structural member filled with a mixture of fly ash and aluminum. Even where such cenospheres are agglomerated with a substance such as sodium silicate, and possibly some solid fly ash particles, to create larger particles, the weight of such agglomerated particles is sufficiently small as to be acceptable for the purposes of the present invention.

In one embodiment of the present invention, a structural member comprises a steel tube filled with an aluminum foam material. The aluminum foam comprises agglomerated particles of fly ash and, preferably, gas-filled pores formed during infiltration and subsequent solidification. The rigidity of the aluminum foam, in conjunction with particles of fly ash disposed therein, is sufficient to permit reduction of the wall thickness of the steel tube far below that which would be otherwise be needed to prevent buckling of the structural member. The result is a net reduction in the total weight of the structural member. Many procedures for emplacing the metallic foam, including those cited above and those described in greater detail hereinbelow, are applicable to the present invention.

LIST OF FIGURES

FIG. 1 is a schematic partial cross section of a lightweight structural member. It depicts a section of a tubular structural member, filled with foam comprising an aluminum matrix and particles of fly ash disposed therein.

Figure 2:
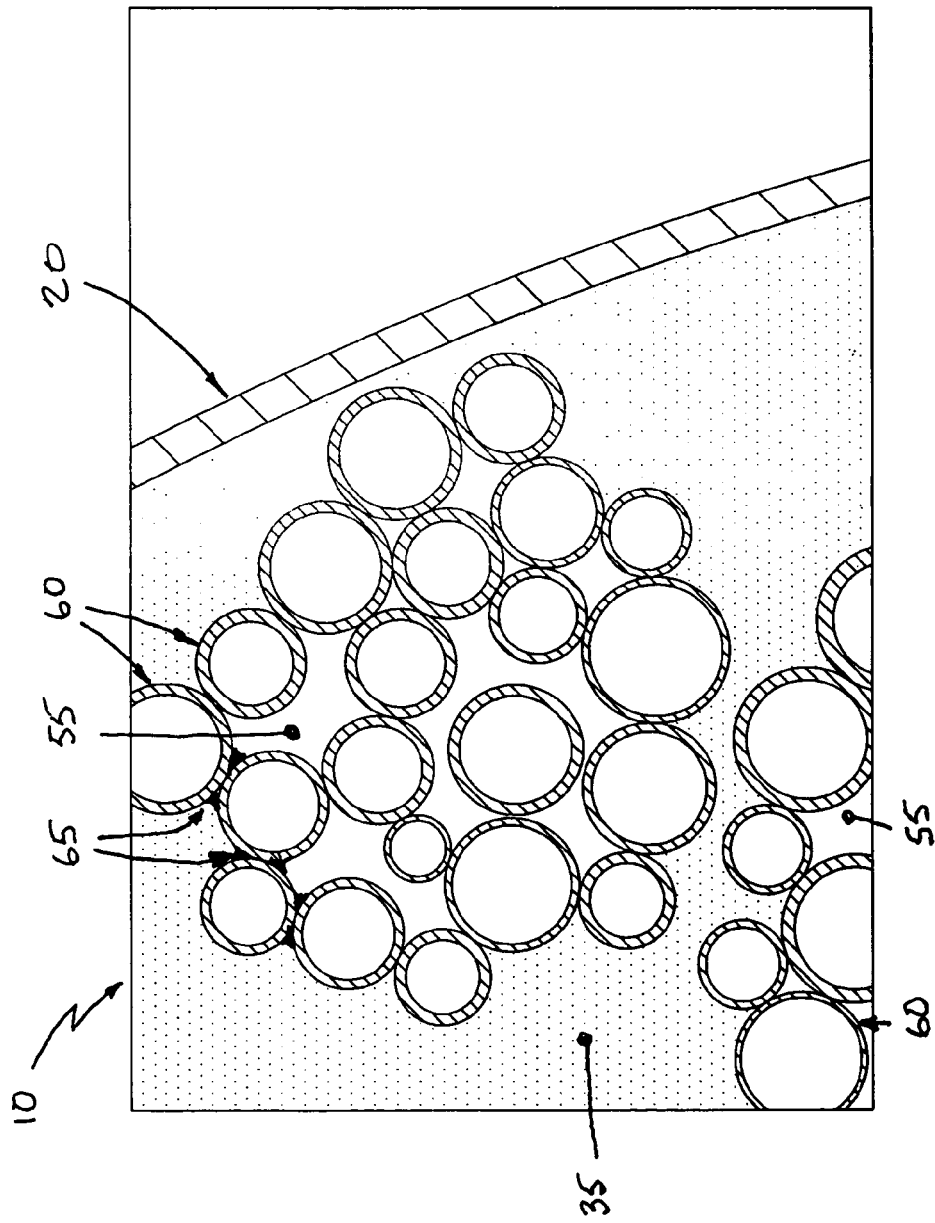

FIG. 2 comprises an enlarged view of the upper right portion of FIG. 1.

Figure 3:
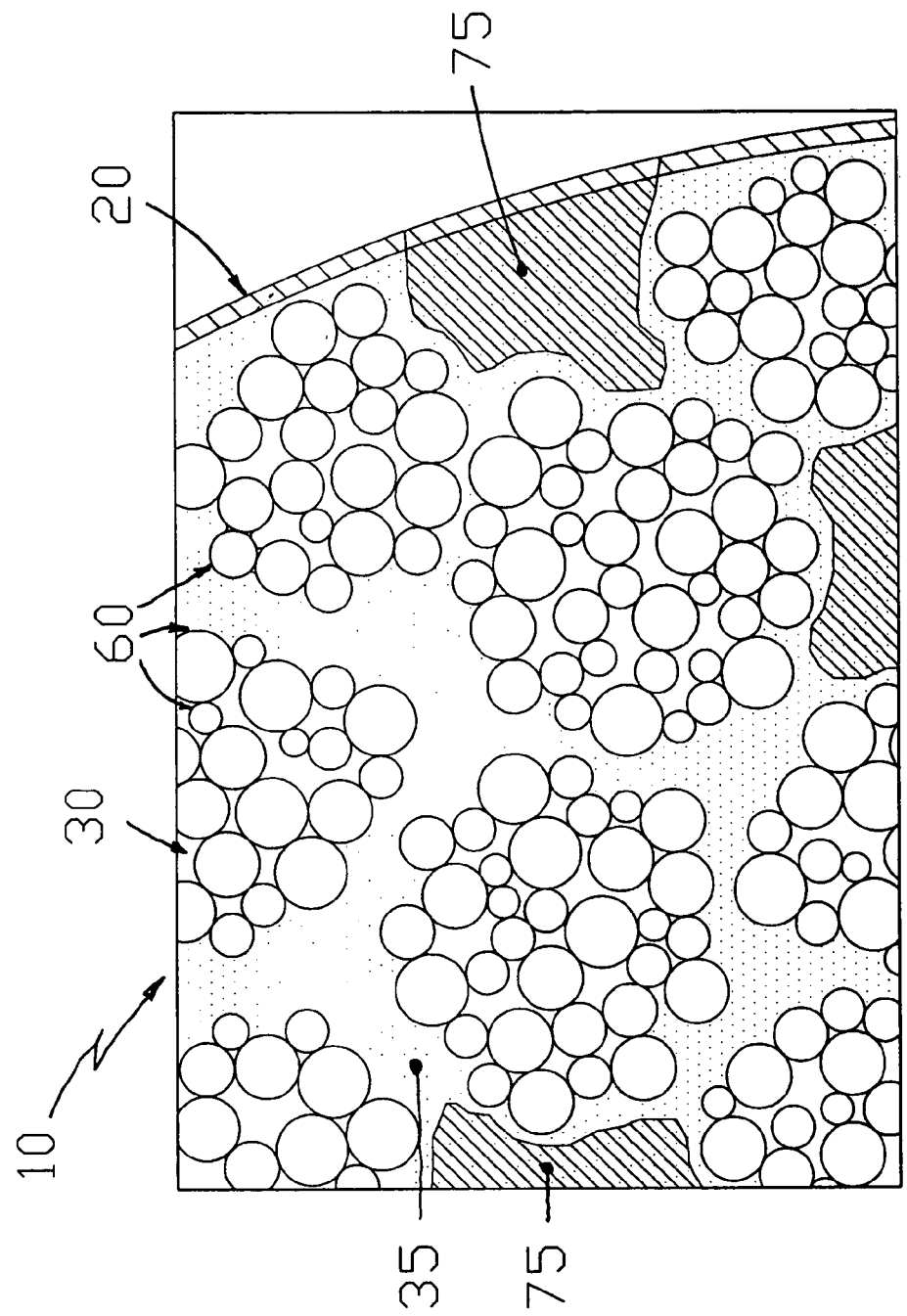

FIG. 3 is a third schematic partial cross section of a lightweight structural member. This structural member is similar to that shown in FIG. 1, except that it additionally comprises gas-filled pores within the foam.

Figure 4:
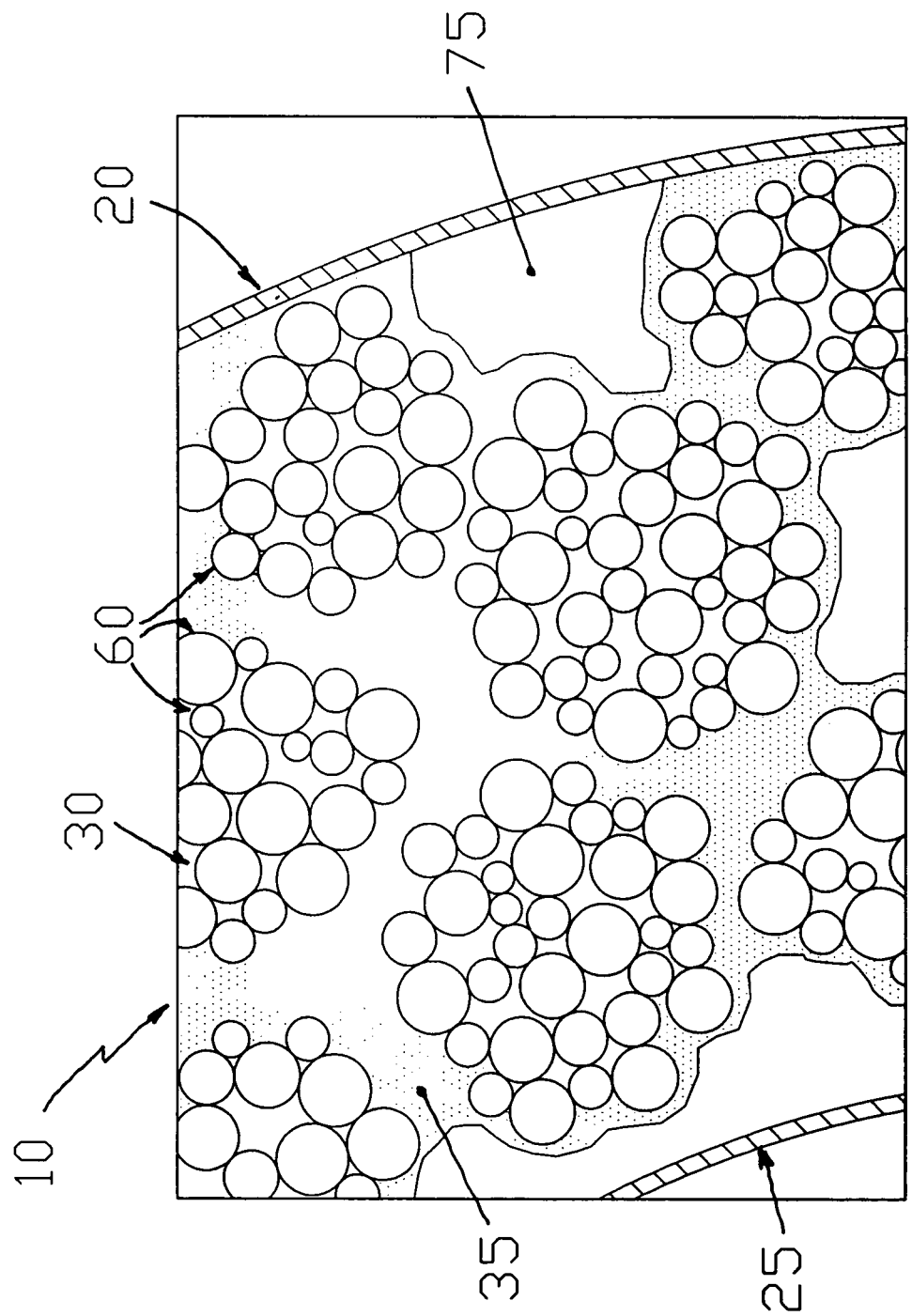

FIG. 4 is a fourth schematic partial cross section of a lightweight structural member. This structural member is similar to that shown in FIG. 1, except that it comprises two tubular structural members, one disposed within the other, wherein the annular volume between the structural tubes is filled with foam comprising an aluminum matrix and particles of fly ash and gas-filled pores disposed therein.

Figure 5:
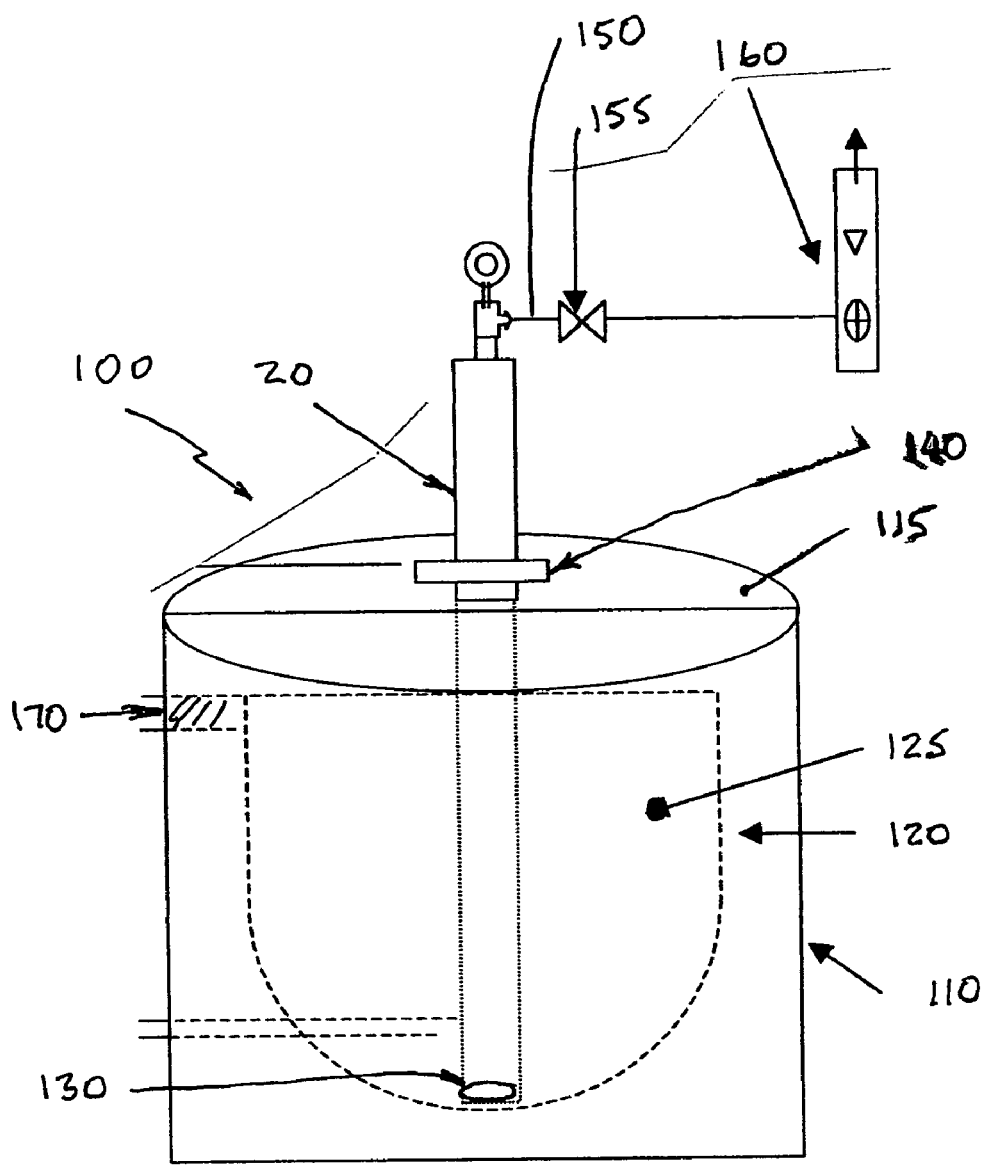

FIG. 5 is a schematic diagram of an apparatus suitable for manufacturing the lightweight structural member of the present invention.

An identification number employed herein refers to the same physical feature, whether that feature is mentioned in the text and/or any of the figures. In the interest of brevity, some features that are common to several figures are described only in the context of one figure.

DETAILED DESCRIPTION OF THE INVENTION

The present invention is conveniently described in conjunction with the appended Figures. In FIG. 1, a partial cross section of a lightweight structural member is shown generally at 10. The member comprises a tubular member 20. The tubular member is configured to carry the entire service load imposed on the structural member, neglecting the possibility that the tubular member might fail in a buckling mode. The configuration and dimensions of tubular member are determined by the nature and magnitude of the service load, including the effects of cyclic loading, aggressive environment, and the like. The space within the tubular member 20 is filled with a lightweight foam material, comprising a nonmetallic particulate material, shown generally at 30, and a metallic matrix material, shown generally at 35. The functionality of the foam material is that it must be strong enough and rigid enough to prevent buckling in the tubular member. For convenience of computation in an engineering analysis of a lightweight structural member, it may be conservatively assumed that the foam material carries none of the axial load applied to the structural member.

The foam material provides resistance to loads applied in a direction generally perpendicular to the surface of the tubular member. Such loads, termed crushing loads, may dent or crush the tubular member by distorting that member from its intended configuration. Any such distortion may increase the vulnerability of a structural member to buckling of the type described by Euler.

In the context of the present invention, each particle of the particulate material is typically comprised of a large number of tiny hollow cenospheres of fly ash that have been agglomerated into larger particles, as shown at 30. In the interest of clarity of the drawing, the cenospheres, shown at 60, are depicted as solid particles; in reality, the particles would be hollow. If fly ash particles in a size range corresponding to that of the agglomerated particles were readily available, the use of such larger particles, shown at 50, would be fully appropriate. The functionality of the matrix material 35 is to fill the space between individual particles, and between the particles and the tubular member, thereby inhibiting buckling in the tubular member.

As the term is used herein, "tubular member" comprehends not only the tubular member shown at 20 in FIG. 1, but also any of several classes of appurtenant structures that may be employed therewith. Also, particulate material, once introduced into the tubular member, and secured therein, may be termed a "bed" of particulate material.

One such class includes closures situated at ends of the tubular members. Such closures may be either permanently or temporarily joined to the tubular member 20. The essential functionality of such closures is that they retain various components of the foam material within the tubular member during manufacture and/or service. Inasmuch as the term "tubular member" comprehends any closures employed therewith, an interior surface of each such closure must logically be deemed to be part of the interior surface of the tubular member, at least for purposes of defining an interior volume within the tubular member.

A second class of appurtenant structures includes any structural element employed to reinforce the tubular member to withstand localized loads that may be greater than nominal loads applied to other regions of the tubular member. In the present discussion, such a structural element is termed a reinforcement. One particular subclass of such reinforcements is directed toward transferring some portion of an applied load to the lightweight structural member. The use of such reinforcements is described in greater detail hereinbelow.

A third class of appurtenant structures includes means for fixing the relative positions of the inner and outer tubular members of an annular structural member, as discussed in greater detail hereinbelow. Other types of appurtenant structures are possible; all are comprehended by the term "tubular member."

It should be noted that a structural element may provide functionalities mentioned in more than one of the aforementioned classes, such as combining that of a closure with that of a reinforcement. Where a single structural element provides multiple functionalities, any name appropriate to whatever functionality is most germane to the context may be employed, and no contradiction in terminology should be construed thereby.

In some embodiments of the invention, the tubular member is advantageously made of low-carbon steel, the matrix material is an aluminum alloy, and the particulate material is agglomerated fly ash. While these materials are deemed to be particularly advantageous to application of the invention, the preference therefor must not be considered limiting on the invention.

Low carbon steel may be advantageously employed as a tubular member in the present invention for several reasons, as follows. It is readily available. It is inexpensive. It is easily shaped into whatever configuration is appropriate to the design of the structural member. It is easily welded or brazed. It can withstand contact with molten aluminum alloys, especially for the typical situation where the duration of that contact is brief. For some applications, stainless steel may be preferable. Austenitic stainless steels, in particular, may be cold worked to a very high strength level, and brief contact with molten aluminum alloys will have minimal effect on that strength level. Also, stainless steels are generally more resistant to attack by an aggressive environment than low-carbon steels. For some applications, the tubular member may be made from an alternate material, such as an aluminum alloy, a polymeric material, or a fiber-reinforced material. Some considerations that may preclude use of such alternate materials include strength level, modulus of elasticity, resistance to degradation of strength at elevated temperatures, and cost.

For many applications, the matrix material is advantageously chosen to be aluminum, or an aluminum alloy. Aluminum alloy 356, having a nominal composition of 7% silicon, 0.3% magnesium, and the remainder Al, has been successfully employed in the present invention. This is one of a broad class of aluminum-silicon alloys that are commonly employed in sand casting, die casting or permanent mold casting. The broader class of alloys may contain from 5 to 13 weight percent silicon, and, optionally, additions of magnesium and/or copper. Such alloys are readily available and inexpensive. They melt at conveniently low temperatures. Recycled aluminum, made by melting recycled beverage cans and the like, may also be suitable. Note that the selection of such alloys must not be considered limiting on the invention. For example, in some applications, a polymer foam material may be sufficiently strong and rigid to inhibit buckling of the tubular member, which is the essential functionality of the foam material.

As a practical consideration, use of the lightweight structural member of the present invention is generally justified by fact that the lightweight structural member is lighter than a thick-walled steel tubular member that might otherwise be chosen. Further, the reduction in weight must be sufficient to justify the cost of additional manufacturing operations required for the lightweight structural member. Thus, it is important that the foam material within the tubular member contain a significant fraction of void space, so that its weight will be minimized. While particular types of foam material and particular manufacturing methods are described herein, any foam material that meets the essential functionality thereof, and any manufacturing method for emplacing the foam material within the tubular member must be deemed to be part of the present invention.

One convenient method for manufacturing the lightweight structural member of the present invention is fabricating the tubular member, filling it with a bed of particulate material, and then infiltrating molten metal into the bed and into the space between the bed and the interior surface of the tubular member. Such a method of manufacture typically leaves the particulate material permanently trapped within the molten metal as it solidifies. Under some conditions it may be possible to extract the particulate material, such as by chemical leaching. This would be the case when using rock salt to create pores in the aluminum foam. However, any moist residue of rock salt may degrade the mechanical properties of aluminum foam, so that this technology is necessarily used with caution. Further, such extraction may entail considerable cost and inconvenience.

FIG. 2 represents an enlarged view of the upper right portion of FIG. 1. In FIG. 2, the individual fly ash particles 60 are shown as hollow cenospheres, to better represent a preferred embodiment of the invention. An agglomerating agent, shown in one localized region at 65, is provided to secure adjoining fly ash cenospheres to each other. In practice, the agglomerating agent is employed throughout each agglomerated particle, wherever two cenospheres come into contact. Each agglomerated particle typically comprises pores, or void spaces, shown at 55. The small size of such pores typically precludes infiltration of matrix material into agglomerated particles.

In some embodiments of the manufacturing process described herein, bubbles or pores of air or other gas may be formed in the metallic matrix, as it is infiltrated into the bed of particulate material. Such bubbles are shown in FIG. 3, at 75; in practice, such bubbles may exist throughout the matrix material, wherever there had been a sufficiently large vacant space in the bed of particulate material prior to infiltration. To the extent that such bubbles reduce the effective specific gravity of the foam material employed in the present invention, such bubbles are deemed to be desirable. However, an excessive level of bubbles or pores might render the foam material too weak to prevent buckling of the lightweight structural member.

The preferred means for creating bubbles is infiltrating the molten metallic material into the bed of particulate material at a relatively high linear velocity. In the context of the present invention, a "high" linear velocity would be on the order of one inch per second. It is believed that "high" linear velocity creates sufficient turbulence in the flow of molten metal that gas bubbles are formed. There may be localized regions between individual particles where the molten metal advances, in the form of a jet of metal, far faster than the nominal linear velocity. By contrast, a "low" linear velocity of infiltration, on the order of a hundredth or tenth of an inch per second, will produce very few gas bubbles. In the context of the present invention, the distinction between "high" and "low" infiltration velocities is made on the basis of the volume fraction of bubbles found in a manufactured structural member, and not on the basis of specific manufacturing parameters associated with the infiltration process.

An ideal particulate material is light in weight, preferably containing a substantial amount of internal void space, and very low in cost. One such material is fly ash. As described hereinabove, fly ash is a waste material produced during operation of coal-fired electric generating plants. Disposal of fly ash is a significant economic and ecological problem for operators of such generating plants. When used as a component of a lightweight structural member, the fly ash has minimal cost. Further, individual particles of fly ash frequently exist as cenospheres, which are hollow bubbles of a glass-like ceramic material. Incorporating fly ash cenospheres in the foam material of the present invention reduces the effective specific gravity of the foam material by about one half, or more.

Some electric generating plants use a water collection system to collect fly ash, thereby avoiding discharge of fly ash into the atmosphere. In such systems, a slurry of fly ash in water is collected from the combustion portion of the plant, and then pumped to a settling basin. There, some cenospheres that contain sufficiently large internal bubbles float to the surface, while cenospheres that contain smaller bubbles, and fly ash particles without bubbles, sink to the bottom. The floating cenospheres are skimmed from the surface, dried, classified by size, and packaged for shipment to a wide variety of industries.

The success of manufacturing a metallic foam according to the methods of the present invention depends on infiltrating the molten metallic material into the interstices between particles of the particulate material. This process of infiltration is affected by the surface tension of the molten metallic material, which in turn affects wetting of the particles by the molten metallic material, which in turn affects the likelihood that the particles will float, or otherwise move from their respective positions resulting from initial emplacement within the tubular member. Floating is detrimental to the present invention, for the resulting lightweight structural member is likely to have some regions within the tubular member that are filled with loose particulate material and other regions where the solidified metallic material is substantially free of pores or trapped particulate material. Although a moderate amount of inhomogeneity in the foam material within the tubular member is deemed tolerable, in the context of the present invention such inhomogeneities are preferably avoided.

The likelihood of such undesirable inhomogeneities can be reduced by increasing the particle size of the particulate material. It is believed that the effect of surface tension of the liquid metallic material on infiltration is reduced thereby. While it might be possible to operate an electric generating plant to produce fly ash particles in a specified range of particle sizes, the need to produce electricity in the most efficient manner necessarily dominates the choice of operating conditions of the generating plant. The particles of fly ash resulting from such operating conditions are generally much smaller than would be desired for the present invention. Typically, at least half of the particles of fly ash are −150-mesh Tyler screen size (less than about 0.1 mm in nominal diameter). Therefore, the preferred mode of the present invention includes the step of agglomerating fly ash particles to make larger particles for the lightweight structural members. The fly ash particles, as received from a power plant, are simply mixed with an agglomerating agent, or binder, such as sodium silicate, formed into larger particles of a suitable size range, and dried. The preferred amount of binder is less than about ten percent by volume, and more preferably between about 2% to 5%, by volume. This amount of binder is substantially less than the amount of void space between closely packed spheres, which is about 25% by volume, but sufficiently high to secure the particles to each other. The size range of agglomerated fly ash found to be preferable for the present invention is +10/−3 mesh Tyler screen size. This notation means that the fly ash particles are small enough to pass through a 3-mesh screen, but large enough to be retained on a 10-mesh screen. It is believed that a wider range of screen sizes, from about +32 mesh (about 0.5 mm) to about 10 mm, may be suitable. [The nominal spacing of wires in such screens defines a characteristic dimension of particles that pass through the screen, or are retained on the screen.] One practical limitation is that the benefits of agglomeration are lost if the agglomerated particles are too small. At the other extreme, overly large agglomerated particles may cause problems in attempting to fill the interior volume of the tubular member. Agglomerating fly ash particles enhance one important benefit of using fly ash in making the foam, namely, light weight. Hollow cenospheres of fly ash remain hollow, and limiting the amount of binder to the minimum amount needed secure the fly ash particles to each other will leave some void space within each agglomerated particle, between the small particles of which it is comprised. The structure of a typical agglomerated particle is shown at 30 in FIG. 2. It is comprised of small particles, shown at 60, that are secured to each other with binder material 65.

It is convenient to visualize the structural member of the present invention as a tubular member that is substantially filled with foam material. As a general rule, the more completely a tubular member is filled with foam material, the better it will resist buckling under either axial or crushing loads. The nature of the intended application of the lightweight structural member will generally determine how critical it is to fill the internal volume of the tubular member with foam material. Thus, manufacturing processes for producing structural members of the present invention may be adjusted to maximize the filling of the tubular member. However, the extent of filling the tubular member with foam material cannot be regarded as limiting on the scope of the present invention.

It is also convenient to visualize the tubular member as axisymmetric, having a uniform circular cross section throughout its length. This is the configuration illustrated in FIGS. 1 and 3. However, this presumption is not limiting on the present invention. The cross section may be rectangular, or any desired configuration. There is no particular need for the cross section to be uniform in either shape or size throughout its length. The tubular member may be whatever shape is appropriate for carrying the intended load, and for interaction with other structural components. As discussed hereinbelow, the tubular member may even be a mold.

The present invention is fully applicable to structural members where the tubular members are, in fact, not closed tubes. A tubular member may be a channel, or a tube that is nearly, but not quite, a closed tube. One important design consideration is that means for securing the foam material to the structural member must be provided. Such means may include securing the foam material to the tubular member, such as by rivets, an adhesive, or by overhanging features in the tubular member. All such variations to the present invention are disclosed hereby, and included within the scope thereof.

The present invention is also applicable to a structural member of generally annular configuration. In this embodiment of the invention, two tubular members are employed. One tubular member is nested within the other, and the annular volume between the two tubular members is filled with foam material. The total weight of the structural member is reduced by the weight of foam material that would otherwise be needed to fill space inside the inner tubular member. For applications where the principal loading on the structural member is bending or torsional, the outer tubular member will carry most of the applied load; where the loading is axial tension, the inner tubular member can carry a significant part of the load. This embodiment of the invention is shown schematically in FIG. 4. Here, the foam material fills the annular volume between the inner tube, shown at 25, and the outer tube, shown at 20.

One of the necessary design considerations in any structural member is transferring an applied load from some external component to the structural member. Those skilled in the mechanical design arts will recognize and understand the problem. Many different configurations have been used for this purpose. Some examples of such configurations are: a loop at the end of a cable, a clevis secured to the end of the structural member, internal or external splines or threads formed into the ends of the structural member, and the like. In the context of the present invention, employing such configurations is particularly important. Here, the foam material is used primarily to support the tubular member to inhibit buckling; nearly all of the load applied to the structural member is carried by the tubular member. In many applications, the tubular member is so thin as to preclude use of many common configurations for transferring the applied load to the structural member. Thus, some sort of reinforcement is appropriate in regions where applied load is transferred to the structural member. The reinforcement may be as simple as a reinforcing sleeve secured to either the interior or exterior surface of the tubular member. A slightly more sophisticated type of reinforcement would be a clevis secured to the tubular member. Many other types of reinforcement will suffice. In the context of the present invention, all such reinforcements, or combinations of reinforcements, are deemed to be functionally equivalent, to the extent that any of them serve to transfer an applied load to the structural member. It is presumed that any such reinforcement or other means for transferring an applied load to the structural member described herein, whether known a priori, or hereafter invented, can be employed as a part of the lightweight structural members described herein.

In one embodiment of the present invention, the tubular member is formed from any appropriate material, such as low-carbon steel tubing. Although many modifications of the basic tubular shape can be employed, for this discussion, it will be assumed that the simplest shape, a section of straight tubing having uniform circular cross section, is being used. Reinforcements are typically secured to the tubular member wherever loads will be applied to the structural members. If the methods of securing the reinforcements can withstand the elevated temperatures associated with subsequent manufacturing operations, such reinforcements are advantageously secured prior to filling the tubular member with foam. Brazing is an example of one such technique for securing the reinforcements. If the means for securing the reinforcements cannot withstand elevated temperatures, as is the case with adhesive bonding, filling the tubular member with foam will necessarily precede the attachment of the reinforcements.

As discussed hereinabove, the foam material may be emplaced within the tubular member by many different methods. In one exemplary method, the volume within the tubular member is essentially filled by a bed of agglomerated fly ash particles. Molten metal is then infiltrated through the bed. Details of this method are described hereinbelow.

The lightweight structural member of present invention, and its specific strength advantages over conventional bar and tubular elements, is further described by the following Examples 1 through 3.

EXAMPLE 1

The following tables illustrate the torsional loads that may be carried by a solid bar and by tubular members. It is assumed that the material of the solid bar or tubular member is low-carbon steel having a yield strength of 36,000 pounds per square inch. In Table I, values of the maximum torque that may be carried by round structural members, 4 inches in diameter, are reported. Several different wall thicknesses have been incorporated into the calculations. Likewise, two different values of density of aluminum foam have been incorporated into the calculations. To facilitate comparison among the various configurations of structural members, Table I reports weight per foot for each configuration. In the column at the right of Table I, the torque that the configuration can support, divided by the weight per foot of that configuration, is reported. The numbers in this column provide a measure of the efficiency of that configuration in carrying a torsional load.

minum foam have been incorporated into the calculations. To facilitate comparison among the various configurations of structural members, Table II reports the dimensions for each configuration. In the column at the right of Table II, the torque that the configuration can support, divided by the weight per foot of that configuration, is reported.

EXAMPLE 3

In Table III, values of the maximum torque that may be carried by annular structural members are reported. In each case, the structural member is comprised of an outer tube having a wall thickness of 0.050 inch and an inner tube having a wall thickness of 0.030 inch. The outside diameters of the two tubes differ by one inch. Many combinations of tube diameters and wall thicknesses are possible.

Note that the numerical values employed in these Examples and Tables have been chosen for illustrative purposes, and those values should not be construed as limiting on the present invention.

The apparatus shown schematically in FIG. 5 has been successfully employed in the manufacture of lightweight structural members of the present invention. The apparatus is shown generally at 100. In one embodiment of the apparatus, it comprises a furnace having an open top, shown at 110, and a cover, shown at 115. The apparatus additionally comprises

TABLE I

Comparison of Torsional Load Capacities
and Weights per Unit Length of Lightweight Structural Members
(Constant Outside Diameters)

| Type of Structural Member | Density of Al Foam, lbs/in$^3$ | Outer Diameter, in | Wall Thickness, in | Max Torque, ft-lbs | Weight of Steel/Ft, lbs | Weight of Alum/Ft, lbs | Total Weight/Ft, lbs | Empty Tube, Torque/Lb, ft-lbs | Filled Tube, Torque/Lb, ft-lbs |
|---|---|---|---|---|---|---|---|---|---|
| Solid shaft | NA | 4.000 | 2.000 | 37699 | 57.91 | 0.00 | 57.91 | 651 | 651 |
| Steel tube, filled with Al | 0.05 | 4.000 | 1.000 | 35343 | 43.43 | 1.89 | 45.31 | 814 | 780 |
| Steel tube, filled with Al | 0.05 | 4.000 | 0.500 | 25771 | 25.33 | 4.24 | 29.58 | 1017 | 871 |
| Steel tube, filled with Al | 0.05 | 4.000 | 0.250 | 15601 | 13.57 | 5.77 | 19.34 | 1149 | 806 |
| Steel tube, filled with Al | 0.05 | 4.000 | 0.100 | 6993 | 5.65 | 6.80 | 12.45 | 1239 | 562 |
| Steel tube, filled with Al | 0.05 | 4.000 | 0.050 | 3631 | 2.86 | 7.17 | 10.03 | 1270 | 362 |
| Steel tube, filled with Al | 0.017 | 4.000 | 1.000 | 35343 | 43.43 | 0.63 | 44.06 | 814 | 802 |
| Steel tube, filled with Al | 0.017 | 4.000 | 0.500 | 25771 | 25.33 | 1.41 | 26.75 | 1017 | 964 |
| Steel tube, filled with Al | 0.017 | 4.000 | 0.250 | 15601 | 13.57 | 1.92 | 15.49 | 1149 | 1007 |
| Steel tube, filled with Al | 0.017 | 4.000 | 0.100 | 6993 | 5.65 | 2.27 | 7.91 | 1239 | 884 |
| Steel tube, filled with Al | 0.017 | 4.000 | 0.050 | 3631 | 2.86 | 2.39 | 5.25 | 1270 | 692 |

Assumptions

Density of Steel = 0.284 lbs/in$^3$

Yield Strength = 36 ksi

Outer Surface of Steel Stressed to Yield Strength

Density of Aluminum Foam = 0.050 lbs/in$^3$ or 0.017 lbs/in$^3$

Aluminum Foam Supports No Load, Except to Prevent Buckling

EXAMPLE 2

In Table II, values of the maximum torque that may be carried by round structural members, each having a weight of about 10 pounds per foot, are reported. Several different diameters and wall thicknesses have been incorporated into the calculations. Also, two different values of density of alua gas-tight seal between the furnace and cover. The furnace may comprise any convenient means for heating, such as electrical heating coils, employed in a fashion well known to those skilled in the metalcasting arts. Such heating means are not shown in FIG. 5. A crucible 120 is disposed within the furnace 110; metallic material is melted in the crucible, creating a

TABLE II

Comparison of Torsional Load Capacities
and Dimensions of Lightweight Structural Members
(Constant Weight per Unit Length)

| Type of Structural Member | Density of Al Foam, lbs/in^3 | Diameter, in | Wall Thickness, in | Max Torque, ft-lbs | Weight of Steel/Ft, lbs | Weight of Alum/Ft, lbs | Total Weight/Ft, lbs | Empty Tube Torque/Lb, ft-lbs | Filled Tube Torque/Lb, ft-lbs |
|---|---|---|---|---|---|---|---|---|---|
| Solid shaft | NA | 1.664 | 0.832 | 2714 | 10.02 | 0.00 | 10.02 | 271 | 271 |
| Steel tube, filled with Al | 0.05 | 1.840 | 0.500 | 3510 | 9.70 | 0.33 | 10.03 | 362 | 350 |
| Steel tube, filled with Al | 0.05 | 2.500 | 0.250 | 5434 | 8.14 | 1.89 | 10.03 | 667 | 542 |
| Steel tube, filled with Al | 0.05 | 3.496 | 0.100 | 5284 | 4.92 | 5.12 | 10.04 | 1075 | 527 |
| Steel tube, filled with Al | 0.05 | 3.584 | 0.090 | 5051 | 4.55 | 5.46 | 10.01 | 1110 | 504 |
| Steel tube, filled with Al | 0.05 | 4.000 | 0.050 | 3631 | 2.86 | 7.17 | 10.03 | 1270 | 362 |
| Steel tube, filled with Al | 0.017 | 1.866 | 0.500 | 3650 | 9.89 | 0.12 | 10.01 | 369 | 365 |
| Steel tube, filled with Al | 0.017 | 2.790 | 0.250 | 6987 | 9.19 | 0.82 | 10.02 | 760 | 698 |
| Steel tube, filled with Al | 0.017 | 4.760 | 0.100 | 10023 | 6.75 | 3.26 | 10.01 | 1486 | 1001 |
| Steel tube, filled with Al | 0.017 | 5.110 | 0.085 | 9949 | 6.18 | 3.83 | 10.01 | 1609 | 993 |
| Steel tube, filled with Al | 0.017 | 5.360 | 0.075 | 9736 | 5.74 | 4.26 | 10.00 | 1697 | 974 |
| Steel tube, filled with Al | 0.017 | 5.786 | 0.060 | 9175 | 4.97 | 5.04 | 10.01 | 1845 | 916 |
| Steel tube, filled with Al | 0.017 | 6.090 | 0.050 | 8526 | 4.37 | 5.63 | 10.01 | 1950 | 852 |

Assumptions
Density of Steel = 0.284 lbs/in^3
Yield Strength = 36 ksi
Outer Surface of Steel Stressed to Yield Strength
Density of Aluminum Foam = 0.050 lbs/in^3 or 0.017 lbs/in^3
Aluminum Foam Supports No Load, Except to Prevent Buckling

TABLE III

Comparison of Torsional Load Capacities
and Weights per Unit Length of Lightweight Structural Members

| Type of Structural Member | Density of Al Foam, lbs/in^3 | Outside Diameter, in | Wall Thickness, in | Max Torque, ft-lbs | Weight of Steel/Ft lbs | Weight of Alum/Ft lbs | Total Weight/Ft lbs | Empty Tube Torque/Lb ft-lbs | Filled Tube Torque/Lb ft-lbs |
|---|---|---|---|---|---|---|---|---|---|
| Filled tubes | | | | | | | | | |
| Steel tube, filled with Al | 0.050 | 4.000 | 0.050 | 3631 | 2.86 | 7.17 | 10.03 | 1270 | 362 |
| | 0.017 | 4.000 | 0.050 | 3631 | 2.86 | 2.39 | 5.25 | 1270 | 692 |
| Annulus between Steel Tubes Filled with Al | | | | | | | | | |
| Outside tube carrying load | 0.050 | 4.000 | 0.050 | 3631 | 2.86 | 2.93 | | 1270 | |
| Inside tube | | 3.000 | 0.030 | 926 | 1.29 | | | 718 | |
| * Both tubes carrying load | | | | 4557 | | | 7.08 | 1988 | 644 |
| Outside tube carrying load | 0.017 | 4.000 | 0.050 | 3631 | 2.86 | 0.97 | | 1270 | |
| Inside tube | | 3.000 | 0.030 | 926 | 1.29 | | | 718 | |
| * Both tubes carrying load | | | | 4557 | | | 5.12 | 1988 | 889 |
| Outside tube carrying load | 0.050 | 5.500 | 0.050 | 6935 | 3.94 | 4.20 | | 1758 | |
| Inside tube | | 4.500 | 0.030 | 2296 | 1.94 | | | 1183 | |
| * Both tubes carrying load | | | | 9231 | | | 10.08 | 2941 | 915 |
| Outside tube carrying load | 0.017 | 7.400 | 0.050 | 12643 | 5.32 | 1.94 | | 2377 | |
| Inside tube | | 6.400 | 0.030 | 4938 | 2.77 | | | 1785 | |
| * Both tubes carrying load | | | | 17581 | | | 10.02 | 4162 | 1754 |

Assumptions
Density of Steel = 0.284 lbs/in^3
Yield Strength = 36 ksi
Outer Surface of Steel (Outside tube only) Stressed to Yield Strength
Density of Aluminum Foam = 0.050 lbs/in^3 or 0.017 lbs/in^3
Aluminum Foam Supports No Load, Except to Prevent Buckling
For Annular Tubes, Inside Tube Supports a Portion of Load, Where Indicated by Asterisk bath of molten metal of appropriate composition 125 therewithin. The furnace is provided with a port 170, through which a pressurizing gas may be introduced into the furnace.

The apparatus further comprises a tubular member 20, and a bed of particulate material disposed therewithin. To secure the particulate material within the tubular member, some sort of closure, either permanent or temporary, may be employed at the lower end of the tubular member. A wad of refractory fiber 130 is sufficient for this purpose.

The apparatus further comprises seal means 140 for effecting a gas-tight seal between the exterior of the tubular member 20 and the top of the furnace 115. Another gas-tight seal is provided between the upper end of the tubular member 20 and an exhaust pipe 150. The exhaust pipe 150 additionally comprises a shutoff valve 155 and, optionally, a flow control valve 160.

The depiction of the tubular member 20 in a vertical orientation is arbitrary, and not limiting on the invention. The apparatus might easily be modified so that the tubular member is disposed in a nearly horizontal orientation. In fact, the apparatus might be further modified to comprise separate means for providing a supply of molten metal, suitably secured to the bottom end of the tubular member, and for preheating the tubular member and the bed of particulate material disposed therein. These and other configurations that provide functionality equivalent to that of the apparatus under discussion are deemed to be disclosed hereby.

The foam material may be advantageously created, in situ, by infiltrating the bed of fly ash particles with a molten metal. Molten aluminum, or aluminum alloy, is particularly appropriate for this purpose. Considerable care should be used in the infiltration process, so that the kinetic energy of a stream of molten metal does not dislodge the bed of fly ash particles. To this end, infiltrating the metal upward from the bottom of the bed of fly ash particles is deemed preferable. Such infiltration can be achieved by pressurizing the molten metal, or by reducing the air pressure in the bed of fly ash particles, or by a combination thereof. The process of infiltration may be aided by preheating the tubular member and the bed of fly ash particles disposed therein. When using 356 aluminum alloy and agglomerated fly ash particles, a preheating temperature of about 1325° F. to about 1375° F. was found to be effective. The molten aluminum was maintained in the same range during the infiltration process.

EXAMPLE 4

The following example will serve to illustrate the operation of the apparatus described herein. The tubular member 20 comprised a 48-inch-long section of rectangular steel tubing, approximately 2 inches by 4 inches by ⅛ inch wall thickness. The tubular member was filled with a bed of particulate material, the bed comprising agglomerated fly ash particles in the +7/−3 size range. A wad of refractory fiber 130 was used to secure the particulate material within the tubular member. The assembly was preheated to approximately 1350° F. The molten metal comprised 356 aluminum alloy, also heated to 1350° F. The apparatus was assembled, as shown in FIG. 5, such that the segment of the tubular member immersed in the molten metal 125 was about 33 inches long. The gas-tight seals were secured. Shutoff valve 155 was closed. Compressed air, at a gauge pressure of about 9 psi was introduced into the furnace through port 170. The system was allowed to reach thermal equilibrium. The shutoff valve 155 was then opened. The molten aluminum infiltrated through the bed of particulate matter within a period of about 20 seconds. The advancing front of molten metal froze when it reached the portion of the steel tubing outside the heated section of the furnace. The nominal linear velocity of the advancing front of metal was approximately 2 inches per second. According to the terminology introduced hereinabove, this would be considered a "high" linear velocity of infiltration.

The lightweight structural member produced thereby contained aluminum foam having a density of about 0.4 grams per cubic centimeter. Quantitative metallography of sections through the foam indicated that it was comprised of approximately 60% by volume agglomerated fly ash, 12% aluminum alloy, and 28% pores, such as that shown at 75 in FIG. 3. The individual particles of fly ash were cenospheres that were collected by flotation in water.

In another experiment, the nominal linear velocity of the advancing front of metals was substantially less, below about 0.05 inch per second. This would be deemed a "low" infiltration velocity. The density of the foam produced in this experiment was about 1.5 grams per cubic centimeter. The structure of this foam was similar to that illustrated in FIG. 1, without any porosity in the metallic material 35. Such foam was deemed to be undesirably dense with respect to reducing the weight of a structural member comprising a steel tube filled with aluminum foam.

After evaluating the results of several experiments, the method for producing lightweight structural members described in Example 4 was selected as the best known mode of the invention, as of the filing date of this application.

The existence of several prior inventions relating to the manufacture of metallic foam articles, cited hereinabove, provides evidence of commercial needs for various forms of metallic foams. Indeed, the present discussion specifically includes the possibility of combining a metallic structural member with a separately manufactured foam reinforcement. While the best mode of the present invention contemplates a structural member comprising a foam component manufactured in situ, nothing stated herein should be construed as limiting the present invention thereto.

The method of manufacture described herein can provide an improved metallic foam that is believed to be lighter and stronger than foam made by previously known methods. The manufacture of such foam may be achieved by substituting a mold for the structural member during the manufacturing process described herein, such as that illustrated by Example 4. In the context of this variant on the present invention, a mold might comprise any appropriate combination of separable or non-separable elements; the essential features of the mold are that it must constrain the particulate material against movement during infiltration, it must contain the molten metal, and that it must permit removal of a completed foam article. A separable mold is preferred because it facilitates removal of the foam article from the mold. In addition to the steps in the manufacturing process disclosed above, there are the additional steps of separating the mold assembly and removing a foam article therefrom. Further processing of the foam article, such as shaping it according to the needs of a particular application, is also contemplated.

While several embodiments of the present invention have been described herein, such descriptions are deemed to be illustrative of, and not limiting on, the present invention. Further, those skilled in the applicable arts will recognize that numerous modifications and variations may be made to the present invention, as described herein, without departing from the true scope thereof, as set forth in the claims appended hereto.

We claim:

1. A lightweight structural member comprising:
   a metallic tubular member, characterized by a wall thickness and interior and exterior surfaces, the interior surface thereof defining an internal volume therewithin; and
   foam material comprising hollow fly ash particulate material, an agglomerating agent and a metallic matrix material, wherein the agglomerating agent agglomerates individual particles of fly ash into agglomerated particles larger than the individual particles; and
   wherein the foam material fills at least a portion of the internal volume of the tubular member.

2. The lightweight structural member recited in claim 1, wherein the foam material fills substantially the entire internal volume of the tubular member.

3. The lightweight structural member recited in claim 1, wherein the metallic material comprises a ferrous material.

4. The lightweight structural member recited in claim 1, wherein the metallic matrix material comprises aluminum.

5. The lightweight structural member recited in claim 1, where the agglomerating agent comprises sodium silicate.

6. The lightweight structural member recited in claim 1, wherein the amount of the agglomerating agent is less than about ten percent of a total volume of the individual particles.

7. The lightweight structural member recited in claim 1, wherein the agglomerated particles are larger than about 0.5 millimeter and smaller than about 10 millimeters in characteristic dimension.

8. The lightweight structural member recited in claim 7, wherein the agglomerated particles are larger than about 1 millimeter and smaller than about 6 millimeters in characteristic dimension.

9. The lightweight structural member recited in claim 1, additionally comprising at least one gaseous substance disposed within three distinct types of pores in the foam material, namely, pores within the metallic matrix material, pores between individual fly ash particles within the agglomerated particles and pores within individual fly ash particles.

10. The lightweight structural member recited in claim 1, wherein the tubular member is characterized by a cross section that is uniform in size and configuration throughout the length of the tubular member.

11. The lightweight structural member recited in claim 1, wherein the tubular member is characterized by a cross section that is not uniform in size and configuration throughout the length thereof, consequent to subjecting the tubular member to at least one forming operation prior to placement of the foam material in the internal volume thereof.

12. The lightweight structural member recited in claim 1, wherein the tubular member additionally comprises an appurtenant structure.

13. The lightweight structural member recited in claim 12, wherein the appurtenant structure comprises a reinforcement.

14. A lightweight structural member comprising:
a first tubular member having a tubular configuration, wherein the first tubular member is characterized by interior and exterior surfaces;
a second tubular member having a tubular configuration, wherein the second tubular member is characterized by interior and exterior surfaces; and
foam material comprising hollow fly ash particulate material, an agglomerating agent and a metallic matrix material, wherein the agglomerating agent agglomerates individual particles of fly ash into agglomerated particles larger than the individual particles;
wherein at least one member of the group consisting of the first tubular member and the second tubular comprises a metallic material;
wherein the interior surface of the first tubular member is of such size and configuration and the exterior surface of the second tubular member is of such size and configuration as to permit disposition of the second tubular member within the first tubular member, thereby defining an annular volume between the interior surface of the first tubular member and the exterior surface of the second tubular member; and
wherein the foam material fills at least a portion of the annular volume.

15. The lightweight structural member recited in claim 14, wherein the agglomerating agent comprises sodium silicate.

16. The lightweight structural member recited in claim 14, wherein the metallic matrix material comprises aluminum.

17. The lightweight structural member recited in claim 14, wherein the metallic material comprises a ferrous material.

18. The lightweight structural member recited in claim 14, wherein at least one tubular member additionally comprises an appurtenant structure.

19. The lightweight structural member recited in claim 14, wherein the foam material fills substantially all of the annular volume, and a spatial relationship between the first and second tubular members is fixed thereby.

20. A method for manufacturing a lightweight composite member, comprising the steps of:
providing at least a first metallic tubular member having tubular configuration, the first tubular member being characterized by interior and exterior surfaces, the interior surface defining an internal volume of the first tubular member therewithin; and
filling at least a portion of the internal volume with a foam material, wherein said foam material comprises hollow fly ash particulate material, an agglomerating agent and a metallic matrix material, said fly ash particulate material comprising a bed thereof; and
wherein the agglomerating agent agglomerates individual particles of fly ash into agglomerated particles larger than the individual particles.

21. The method for manufacturing a lightweight composite member recited in claim 20, wherein the bed of fly ash particulate material additionally comprises agglomerated particles of fly ash.

22. The method for manufacturing a lightweight composite member recited in claim 20, wherein the step of filling comprises filling at least a portion of the internal volume with a bed of fly ash particulate material, and infiltrating molten metal therethrough, thereby filling at least a portion of the internal volume with the foam material.

23. The method for manufacturing a lightweight composite member recited in claim 22, wherein the step of infiltrating is conducted at a high linear velocity, thereby entrapping a gaseous material within pores in the foam material.

24. The method for manufacturing a lightweight composite member recited in claim 20, additionally comprising the step of securing an appurtenant structure thereto.

25. The method for manufacturing a lightweight composite member recited in claim 20, wherein the appurtenant member comprises a reinforcement.

26. The method for manufacturing a lightweight composite member recited in claim 20, additionally comprising the steps of:
providing a second tubular member, the second tubular member being characterized by interior and exterior surfaces, the interior surface thereof defining a second internal volume therewithin, wherein the second tubular member is further characterized by a size and configuration such as to enable placement thereof within the internal volume of the first tubular member; and
disposing the second tubular member within the internal volume of the first tubular member, thereby defining an annular volume between the interior surface of the first tubular member and the exterior surface of the second tubular member; and
wherein the step of filling is characterized by filling substantially all of the annular volume, thereby establishing a fixed spatial relationship between the first and second tubular members, and excluding foam material from the second internal volume.

* * * * *